United States Patent [19]
Cohen et al.

[11] 3,750,397
[45] Aug. 7, 1973

[54] AREA CONTROL INSERT FOR MAINTAINING AIR FLOW UNIFORMITY AROUND THE COMBUSTOR OF A GAS TURBINE ENGINE

[75] Inventors: Joseph David Cohen, Danvers; Neil Roger Brookes, Topsfield; Herbert Carl Stark, West Peabody; Robert Hirschkron, Marblehead; Gerald William Lawson, Boxford, all of Mass.

[73] Assignee: General Electric Company, Lynn, Mass.

[22] Filed: Mar. 1, 1972

[21] Appl. No.: 230,839

[52] U.S. Cl. .............................. 60/39.36, 60/39.65
[51] Int. Cl. ........................................... F02c 7/18
[58] Field of Search ...................... 60/39.36, 39.65

[56] References Cited
UNITED STATES PATENTS

| | | |
|---|---|---|
| 3,631,674 | 1/1972 | Taylor............................. 60/39.36 |
| 3,364,678 | 1/1968 | Alford.............................. 60/39.65 |
| 3,383,855 | 5/1968 | Freeman et al.................... 60/39.65 |
| 3,372,542 | 3/1968 | Sevetz.............................. 60/39.36 |
| 3,049,882 | 8/1962 | LaBastie et al.................... 60/39.65 |
| 3,581,492 | 6/1971 | Norgren et al..................... 60/39.36 |
| 3,589,127 | 6/1971 | Kenworthy et al. ............... 60/39.65 |

Primary Examiner—Carlton R. Croyle
Assistant Examiner—Warren Olsen
Attorney—Edward S. Roman et al.

[57] ABSTRACT

Means for improving flow uniformity and reducing disturbances in compressor discharge air flowing through passages around the combustion chamber of a gas turbine engine are provided by an area control insert. The insert comprises circumferentially and longitudinally extending walls within the forward portions of the air passages to constrict the cross-sectional areas of the passages. Such constriction operates to minimize pressure gradients within the turning and splitting air flow and thereby reduce the tendency for the air flow to separate from the passage walls at random locations around the periphery thereof.

1 Claim, 3 Drawing Figures

PATENTED AUG 7 1973

3,750,397

AREA CONTROL INSERT FOR MAINTAINING AIR FLOW UNIFORMITY AROUND THE COMBUSTOR OF A GAS TURBINE ENGINE

BACKGROUND OF THE INVENTION

This invention relates generally to an area control insert for maintaining air flow uniformly around the combustion chamber of a gas turbine engine, and more particularly to an area control insert for minimizing pressure gradients and reducing random flow separation from the walls of the flow passages around the combustion chamber of a gas turbine engine.

It is common in the gast turbine art to continuously strive for improved versions of well established engine designs. Such engines, generally referred to as growth engines, may in one form have increased thrust and efficiency provided by an increased maximum operating temperature. Increased temperatures can be made possible through the introduction of improved alloys within the turbine stage or through redesign of the turbine cooling mechanism. For such growth engines it is often desirable that the original combustion design be retained, thereby avoiding the expense and time consumed in redesigning and retooling to manufacture an entirely new combuster.

Gas turbine combustion apparatus generally includes a combustion chamber surrounded by spaced apart inner and outer casings, which, in cooperation with the combustion chamber, define inner and outer passages respectively. Air flow from a gas turbine compressor is divided, with a portion circulated through the combustion chamber. The remainder of the air is circulated through the inner and outer passages around the combustion chamber. The air then enters the combustion chamber through openings in a combustion liner so as to both support combustion and reduce the temperature of the hot gases of combustion before they are directed to a turbine.

The forward ends of the inner and outer air flow passages are quite generally divergent and effect a reduction in velocity of the air flow as it enters the area of the combustor apparatus. Due to the air flow velocity decrease through the initial divergent portions of the passages it is often difficult to predict the exact nature of the pressure gradients within the flow field. Non-uniform pressure gradients can cause the air flow to separate at random locations particularly along the inner casing of the inner passage. Such random flow separation precipitates a non-uniform flow field within the passages and is an undesirable condition, particularly at the increased operating temperatures of a growth type of engine. The non-uniform flow field can lead to overheating of the liner in streaked areas along the length of the liner. Such localized overheating will often lead to a deterioration of the liner which upon routine inspection is genrally first manifest by a visible streaked discoloration of the liner commonly referred to as hot streaking. The localized overheating caused by random flow separation can extend the length of the liner into the turbine also causing deterioration of the turbine.

Any combustion apparatus for a gas turbine engine may have a limited degree of random flow separation within its inner and outer passages, but hot streaking may not be a significant problem because the operating temperature of the combustor is sufficiently low that the non-uniform flow field still provides for adequate performance. However, a growth version of the same engine may call for a significantly increased operating temperature. whereupon hot streaking may suddenly manifest itself as a significant problem which, if uncorrected, will lead to rapid deterioration of the combustor and turbine hardward and reduced intervals between replacement.

Heretofore, the designer had no choice, in such a case, but to completely redesign the combustor apparatus which involves substantial additional time, together with materially increased cost. Such additional time and expenditure increases the overall cost for the growth version of an engine, making it substantially less attractive.

Therefore, it is an object of this invention to rovide a simple and economical means by which the air flield uniformity in the combustion apparatus of agrowth type of engine might be optimized without completely redesigning the combustor.

It is also an object of this invention to provide a simple and economical means of preventing hot streaking and rapid deterioration of the combustor and turbine in growth types of engines where the operating temperatures have been substantially increased.

It is a further object of this invention to provide a simple and economical means for minimizing random air flow separation from the air passage casings so as to permit an increased engine operating temperature.

SUMMARY OF THE INVENTION

Gas turbine combustion apparatus of the typ suitable for inclusion of the means of this invention generally includes a combustion chamber mad up of spaced apart inner and outer annular liners. Inner and outer cowl portions extend from the forward ends of the respective liners and converge together to form a flow divider. An outer wall or casing spaced apart from the outer liner and cowl defines an outer air flow passage therebetween, and an inner wall or casing spaced apart from the inner liner and cowl defines an inner air flow passage therebetween. The means of this invention for providing improved air flow field uniformity includes an area control insert comprising circumferentially and longitudinally extending walls attached to a cowl portion, wherein the major inside surface of the wall is spaced apart from the cowl portion so as to constrict the effective cross-sectional area of the forward portion of the flow passage, thereby preserving the high velocity character of the flow and minimizing the tendency for the air flow to separate from the walls of the flow passages at random locations.

DESCRIPTION OF THE DRAWINGS

While the secification concludes with claims distinctly claiming and particularly pointing out the invention described herein, it is believed that the invention will be more readil y understood by reference to e discussion below and the accompanying drawings in which:

DESCRIPTION OF THE PREFERRED EMBODIMENT

Figure 1:
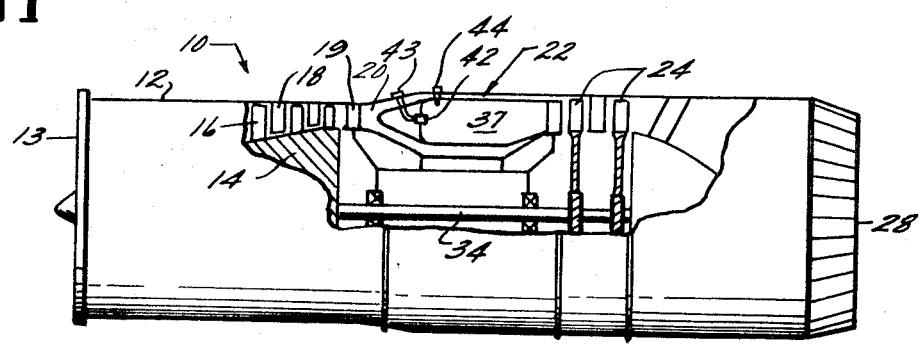
FIG. 1 is a partly cutaway side view of a gas turbine engine embodying the combustion apparatus of this invention.

Referring specifically to FIG. 1, there is shown generally at 10 a gas turbine engine of the well known turbojet variety. While this is used as an example to illustrate the invention, it will be appreciated that the invention has application to any apparatus utilizing a continuous fluid flow combustion system; for example, aircraft turbofan or land-based combustion engines. In any event, as shown in FIG. 1, the gas turbine engine 10 includes an outer housing 12 having an inlet end 13, receiving air which enters a compressor 14 which may be of the multistage axial flow type having rows of rotor blades 16. Interspersed with the rotor blades are rows of stator blades 18 which are affixed at one end to the inner surface of the housing 12. At the downstream end of the compressor 14 is a row of compressor outlet guide vanes 19, followed by an annular diffuser passage or compressor discharge passage indicated generally at 20.

The diffuser discharges the pressurized air into a combustor indicated generally at 22 from whence the heated gases exit at high velocity through the power turbine 24. The power turbine extracts work to drive the compressor 14 by means of connecting shaft 34 on which both components are mounted. The rotating compressorturbine set is mounted in the engine by suitable bearing means. The hot gas stream leaving the turbine is discharged to atmosphere to provide thrust through an exhaust nozzle which may be of the adjustable type as shown at 28.

Figure 2:
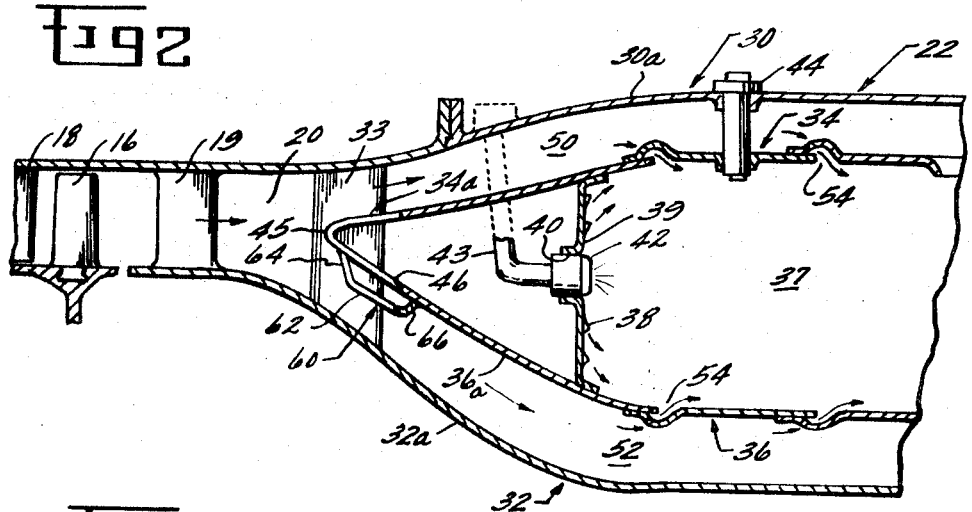
FIG. 2 is an enlarged cross-sectinal view of the combustion apparatus of FIG. 1 showing the means of this invention for reducing random air flow separation from the walls of the air flow passages.

Referring now to the enlarged view of FIG. 2, it will be seen that the combustor comprises an outer casing wall, indicated generally at 30, and an inner casing wall, indicated generally at 32. The outer and inner walls are radially spaced from a pair of outer and inner combustion chamber liners, indicated generally at 34 and 36 respectively. The combustion liners are appropriately supported in the combustor by a plurality of radially extending and circumferentially spaced struts one of which is shown at 33. The liners 34, 36 are interconnected at their forward ends by an annular transverse wall or dome 38 having a plurality of louvers 39 therethrough to accommodate the flow of pressurized air into the combustion chamber 37. Intermediate the radially spaced ends of dome 38 there is a plurality of circumferentially spaced openings of which only one is shown at 40. The openings 40 are adapted to receive fuel nozzles 42 which are supplied through conduit 43 with fuel to support combustion. Suitable ignition means such as the igniter 44 are provided in order to initiate combustion.

Figure 3:
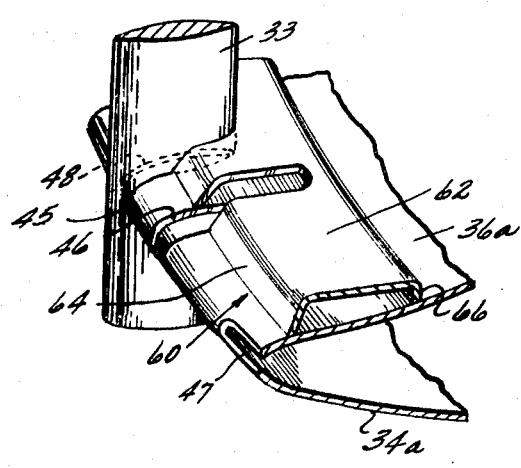
FIG. 3 is a partial perspective view of the combustion apparatus of FIG. 2 as viewed from the bottom of the engine showing the means of this invention for reducing random air flow separation from the walls of the flow passages.

The combustor walls 30, 32 and liners 34, 36 cooperate to define three concentric annular flow paths into which air from the compressor is split. The forward ends of the liners 34, 36 have cowl portions 34a, 36a respectively, which converge into an annular edge 45 so as to split the flow into two streams. A plurality of circumferentially spaced openings 46, which may best be viewed in FIG. 3, are disposed around the forward edge 45 of the cowl portions 34a, 36a and provide for the entrance of a compressed stream of air into the combustion chamber 37 defined by these liners. Additional compressed air is admitted to the combustion chamber through the circumferentially extending openings 47. Strut 33, which is illustrated in FIG. 3 partially in phantom, has a generally teardrop cross-section an intersects the converging cowl portions 34a, 36a at the generally V shaped cut 48. The forward ends of the combustor walls also have mutually convergent portions 30a, 32a and are joined to the ends of the diffuser 30 walls.

The combustor wall 30 and liner 34 define an outer cooling flow passage 50 and the liner 36 and combustor wall 32 define an inner cooling flow passage 52 wherein both passages are first divergent from the diffuser flow path and then curve to the longitudinally extending downwstream portions of the liners. The inner and outer flow passages 50, 52 provide air for cooling the combustor walls as well as supplying additional dilution air through liner openings 54 downstream of the nozzle 42 for mixing with cooling the combustion gases before they reach the turbine.

Air flow through the initial divergent portions of the flow passages 50, 52 is often difficult to predict and may precipitate random flow separation from the combustor walls 30, 32. Random separation of the air flow from the walls of the liner disturbs the uniformity of the flow field, precipitating hot streaking along the combustion liner which materially shortens the effective life of the liner and turbine. As previously discussed, this problem is particularly acute with so-called growth engines where increased combustor temperatures may cause rapid deterioration of the liners and turbine in cases where the combustion apparatus had not previously been designed for optimum flow field uniformity. However, it should be remembered that the original combustor design may well have been entirely satisfactory of operation within the original temperature range, and it is only th increased operating temperatures of the gtowth engine which suddenly precipitate the latent problem of hot streaking Confronted with this problem, the designer heretofore had no choice but to implement a time consuming and costly redesign of the entire combustor apparatus resulting in a substantially more expensive growth engine, and this was in effect, what happened for years prior to our invention. However, we have found that the device of this invention can simply and economically overcome the necessity for an entirely new combustor design.

Referring now to both FIG. 2 and FIG. 3, there is illustrated a typical combustor where hot streaking might exist particularly in the area adjacent the inner cowl portion 366a. During engine operation, air delivered from the compressor 14 through the compressor outlet guide vanes 19 become spit by the converging areas of the cowl portions 34a and 36a. The gas stream from the diffuser passage 20 is turned outwardly by the outer flow passage 50 and inwardly by the inner flow passage 52. Rapid increase in area within the flow passages 50, 52 cause a reduction in the velocity of the air flowing therethrough, thereby resulting in a decrease in the pressure of the air flowing within the passage 50, 52. As can be readily seen from the drawing, for the particular engine design shown, the portion 32a of the inside combustor casing wall 32 diverges more rapidly than the portion 30a of the outside combustor casing wall 22. This rapid divergence of the inside wall 32, particularly in the areas adjacent the inner cowl portion 36a, can lead to severe random flow separation from the combustion liner resulting in severe hot streaking with the combustion chamber.

The are control insert of this invention minimizes the flow separation and attendant hot streaking of the combustion chamber in a simple and economical manner without necessitating the entire redesign of the combustion liner. The area control insert is shown in the drawings as comprising a circumferentially and longitudinally extending wall shown generally at 60 and including a major inner surface 62 maintained radially inward of the inner cowl portion 36a so as to constrict the effective cross-sectional area of the forward portion of the inner flow passage. The forward end of the wall 60 is preferably flared in a generally outward radial direction into theinner cowl portion 36a as indicated at 64 in order to maintain a smooth and uniform streamlined air flow over the forward edge of the wall 60. The aft end of the wall 60 terminates in a blunt edge 66 which operates in the manner of a step diffuser causing a rapid uniform expansion of the flow field passing the thereover. It is preferred that the wall 60 be segmented into discrete arcuate sectins as best shown in FIG. 3 in order to better facilitate installation. Also, the wall 60 may be made of the same material as the cowl and can be welded to the cowl in a manner well known to the art.

While the inventors do not intend to be bound by any particular theory of operation, it is believed that the unusual benefits and advantages attributable to inclusion of the are control insert may be explained as follows. Random air flow separation and the attendant hot streaking of the combustion chamber are minimized by the wall 60 in the following manner. The tendency for the air flow to diffuse upon initial entry into the flow passage 52 is substantially reduced passage 52 in that portion adjacent the inner cowl 36a. Decreasing the cross-sectional area of the flow path preserves the high velocity character of the flow around th inner wall portion 32a minimizing pressure gradients and effecting minimal separation of flow from the interior surface of the wall portion 32a, thus minimizing hot streaking. The blunt edge 66 at the aft end of the wall 60 rapidly diffuses the flow causing a uniform reduction in the velocity of air flowing therethrough, together with a uniform increase in the static pressure of the flow within the cooling passages. The flow reattaches to the inner cowl surface 36a causing a uniformly reduced velocity flow field to flow over the cooling liner 36 and through the liner openings 54. This sudden uniform reduction in velocity and increase in pressure in the area of the cooling passages immediately upstream of the liner openings 54 inhibits hot streaking and failitates flow mixing with only a slight pressure drop between the passage 52 and the interior of the combustion chamber 37, thereby promotoing greater uniformity of the flow field without additional pressure loss.

Of secondary advantage is the effect that the turbulence immediately aft of the blunt edge 66 has in breaking up the wake behind the strut 33. If the wake behind strut 33 were left undisturbed, there would be a distinct tendency to develop hot streaking in this area.

As has been made readily apparent, the above described wall is of particular advantage for increasing the operating temperatures of established engines which might not have been designed for optimum flow field uniformity due to the difficulty in intially predicting the air flow through the divergent portions of the flow passages. Economy and simplicity make the device most attractive particularly for those situations where the only alternative would necessitate a costly redesign of the entire combustion apparatus.

While only one preferred embodiment of the above described device has been shown and described, it should be ovbious that certain changes could be made in the described embodiment without departing from the broader aspects of the invention. For example, if hot streaking had been experienced due to flow separation in the outer cooling flow passage, then wall 60 could have been attached to the outer cowl portion with equal success. Therefore, in light of the above, it is intended that the appended claims cover all such changes and modifications as fall within the broader conepts of the above disclosure.

Having thus described one embodiment of the invention, what is desired to be secured by letters patent is as follows:

1. In a gas turbine engine of the type having a combustion apparatus which includes spaced apart inner and outer annular liners defining a combustion chamber therebetween, inner and outer converging cowl portions extending from the forward ends of the respective liners wherein the inner cowl portion diverges more rapidly than the outer cowl protion, an outer wall spaced apart from the outer liner and cowl defining an outer flow passage therebetween and an inner wall spaced apart from the inner liner and cowl defining an inner flow passage therebetween, improved flow field uniformity is provided by an area control insert comprising:

a circumferentialy and longitudinally extending wall having a plurality of circumferentially spaced, arcuate segments attached to the inner cowl portion wherein; the major inside surface of the segmented wall is spaced apart from the inner cowl portion so as to constrict the effective cross-sectional area of the forward portion of the inner flow passage, the forward end of the segmented wall is preferably flared in an outward direction into the 9nner cowl portion in order to maintain a smooth and uniform streamlined flow field over the forward edgeof the wall, and the aft end of the wall termintates in a blunt edge so as to provide for the rapid uniform diffusion of air flow passing thereover, thereby providing a uniformly reduced velocity flow field which minimizes the tendency for the air flow to separate from the inner liner at random locations.

* * * * *